PATENTED MAY 30 1972
3,666,287
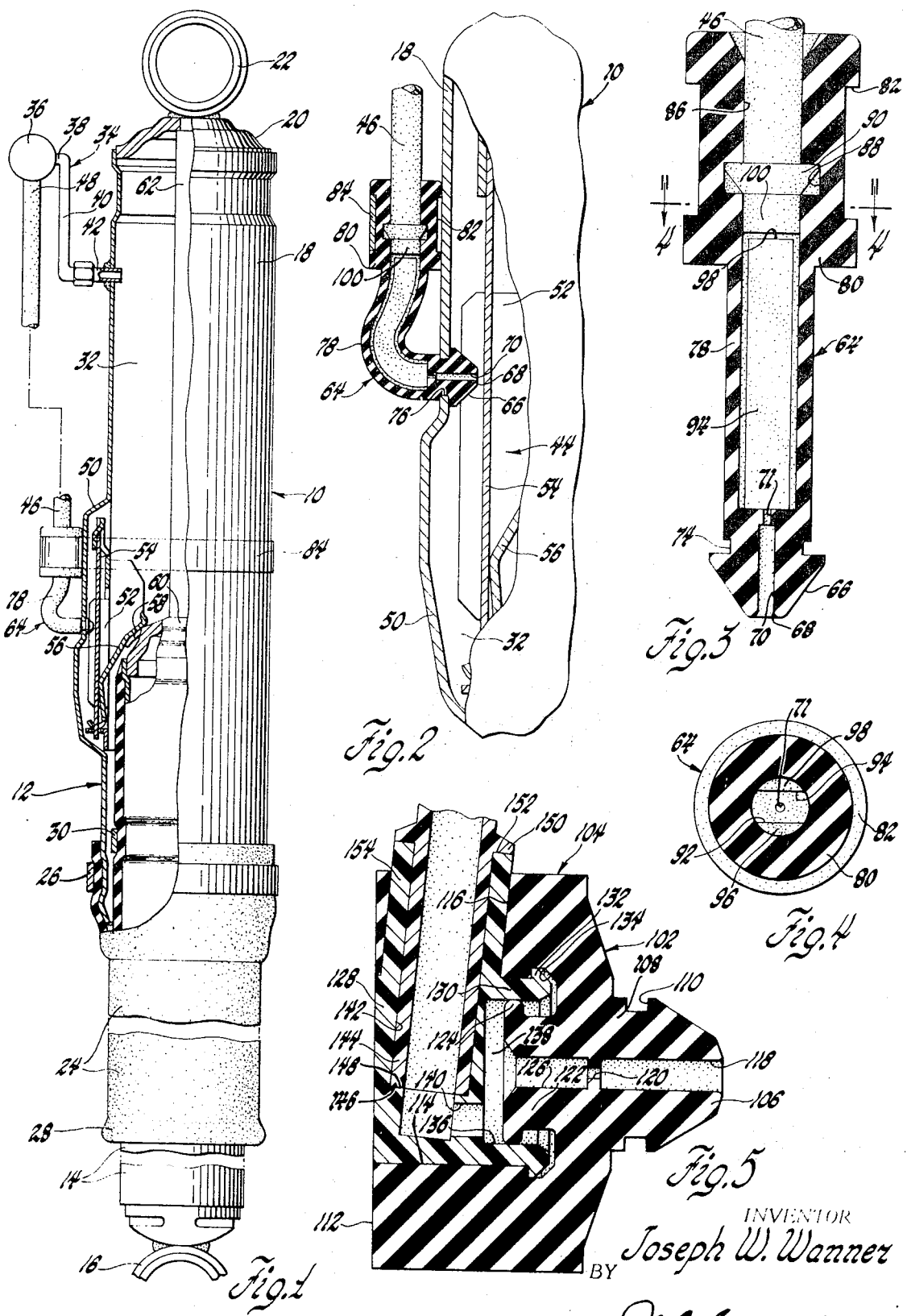
INVENTOR
Joseph W. Wanner
BY
J.C. Evans
ATTORNEY

United States Patent
Wanner

[15] 3,666,287
[45] May 30, 1972

[54] EXHAUST CONTROLLER AND COUPLING FOR VEHICLE LEVELER UNIT

[72] Inventor: Joseph W. Wanner, Kettering, Ohio

[73] Assignee: General Motors Corporation, Detroit, Mich.

[22] Filed: Oct. 5, 1970

[21] Appl. No.: 78,000

[52] U.S. Cl. .................... 280/124 F, 251/303, 267/65 D
[51] Int. Cl. ................................................. B60g 17/04
[58] Field of Search ............... 267/65 D, DIG. 1, DIG. 2; 280/124 F; 251/303

[56] References Cited

UNITED STATES PATENTS

| | | | |
|---|---|---|---|
| 3,592,458 | 7/1971 | Jackson | 267/65 D |
| 3,046,003 | 7/1962 | Schultz | 267/DIG. 2 |

Primary Examiner—Philip Goodman
Attorney—W. S. Pettigrew and J. C. Evans

[57] ABSTRACT

In preferred form, an exhaust controller and coupling for a vehicle leveler unit connected within a closed or semi-closed air pressure system including a pump, an inlet fitting into a pressurizable control chamber of the leveler unit. The exhaust controller is characterized by having a movable valving element operated in response to height changes of the vehicle between open and closed positions. A replaceable, resilient fitting on the leveler includes an inlet end having a flexible seat that engages the movable valving element when in its closed position; the fitting includes an exhaust end outside of the unit which is connected through a right angle elbow coupling to a return conduit from the exhaust valve assembly to the compressor inlet which is located by the elbow coupling in close spaced parallelism with the outer surface of the leveler unit.

4 Claims, 5 Drawing Figures

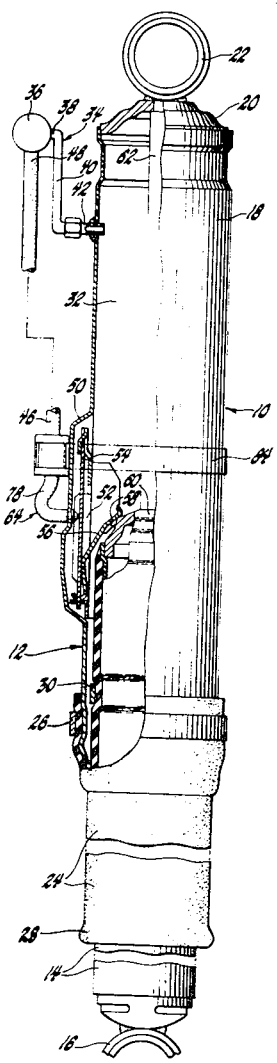

EXHAUST CONTROLLER AND COUPLING FOR VEHICLE LEVELER UNIT

This invention relates to vehicle leveler units and more particularly to an improved exhaust controller and coupling for fluid flow to and from the pressurizable control chamber of a pneumatic leveler unit which is connected to a pump in series flow relationship within a closed or semi-closed pressure system for supplying air to the pneumatic leveler unit.

One class of vehicle leveler units includes a pneumatic pressure control chamber which is typically formed between first and second cylindrical members that are arranged in telescoping relationship with one another and sealed therebetween to define the control chamber.

In these units there are opposite end mounts that are adapted to be connected between the sprung and the unsprung mass of the vehicle. The leveler units cooperate with primary suspension springs that support the sprung mass or chassis of the vehicle with respect to ground engaging portion or suspension components. The pressure in the control chamber is varied in accordance with changes in the height of the sprung mass with respect to the unsprung mass to assist or supplement the load carrying capacity of the primary suspension spring so as to return the vehicle to level when a load has been placed thereon that would tend to reduce the overall length of the primary suspension spring. Likewise, when the vehicle is unloaded so that the primary suspension spring will be elongated and thereby cause the chassis to rise above a desired level relationship with the unsprung mass, the leveler unit has air exhausted from its control chamber to reduce the load carrying capacity of the unit thereby to allow the remaining load on the sprung mass of the vehicle to compress the main suspension spring an amount required to bring the vehicle back to a desired level attitude.

In units of this type the leveler unit may be included in an open system wherein an outlet fitting to the control chamber is in direct communication with atmosphere.

In other cases the leveler unit is characterized by being included in a closed or semi-closed system. In these cases a pressure supply such as a vacuum operated pump supplies air through an inlet conduit directly through an inlet opening to the control chamber. The amount of pressure in the control chamber and the resultant load carrying action of the leveler is dependent upon the control of an exhaust valve assembly which is connected to an exhaust conduit back to the inlet of the pump in the closed or semi-closed system.

In such arrangements it is desirable that the exhaust valve assembly be durable and easily connected within the closed or semi-closed system.

Accordingly, one object of the present invention is to provide improved attachment means for conducting exhaust air from the movable cylindrical member of a pneumatic vehicle leveler back to the low pressure side of a closed or semi-closed system.

A further object of the present invention is to provide improved attachment means in a vehicle leveling system for conducting exhaust air from a pneumatic load leveler unit back to the low pressure side of a closed or semi-closed system by means of a coupling that can be replaced along with a valve seat fitting of the valve assembly from exteriorly of the unit.

Yet another object of the present invention is to provide a low cost easily assembled exhaust valve fitting and coupling assembly which locates an exhaust tube in close proximity to the side of the leveler unit to reduce the amount of space required to locate the leveler unit and the conduits connected thereto with respect to the operative components of a vehicle suspension assembly.

Further objects and advantages of the present invention will be apparent from the following description, reference being had to the accompanying drawings wherein a preferred embodiment of the present invention is clearly shown.

IN THE DRAWINGS:

FIG. 1 is a view in elevation of a leveler unit for a vehicle shown in association with a diagrammatically illustrated air supply system;

FIG. 2 is an enlarged fragmentary view of a leveler unit on its side including an improved exhaust valve and coupling assembly in accordance with the present invention;

FIG. 3 is an enlarged sectional view of a unitary valve and coupling component in the combination of FIGS. 1 and 2;

FIG. 4 is a vertical sectional view taken along the line 4—4 of FIG. 3 looking in the direction of the arrows; and FIG. 5 is an enlarged vertical sectional view of a second embodiment of a valve fitting and coupling arrangement for use in a leveler unit.

Referring now to the drawing, in FIG. 1 a vehicle leveler unit 10 is illustrated which is of the pneumatic type.

In this arrangement the leveler unit is comprised of a shock absorber assembly 12 which includes an outer cylindrical member 14 which has a bottom mounting ring 16 thereon adapted to be connected to an unsprung portion of a vehicle suspension assembly.

The unit further includes an outer cylindrical member 18 which includes an upper cap member 20 that is fixedly secured to a top mounting ring 22 adapted to be connected to the sprung mass of a vehicle.

The leveler unit 10 is one which is adapted to be associated with a standard, primary suspension spring of a vehicle which is connected between the sprung and unsprung mass portions thereof for carrying the sprung mass or the vehicle chassis resiliently above the unsprung mass portion of the vehicle, for example, its rear axle assembly.

In arrangements of this type the leveler unit 10 acts as an auxiliary load supporting device. Thus, when an additional load is placed on the chassis of the vehicle or the unsprung mass portion thereof to cause the primary suspension spring to shorten in length, a compensating pressure is produced in the leveler unit 10 which will cause a resultant force between the bottom and top mounting rings 16, 22 which will raise the vehicle chassis to produce a desired predetermined height relationship between the sprung and unsprung masses.

More particularly, in this arrangement the cylindrical member 14 of the shock absorber and the outer cylindrical member 18 are joined by a flexible sleeve 24 which is connected at the outer end thereof by a clamp ring 26. The sleeve 24 is turned inwardly at 28 and its inner end is located on the outside of the shock absorber cylindrical member 14. At the upper end of the inner end a clamp ring 30 fixedly secures the sleeve 24 to the shock absorber.

The sleeve 24 acts as a seal between the outer cylinder 18 and shock absorber 14 to define a variable volume pressurizable control chamber 32 which acts as a pneumatic spring on the leveler unit 10 for varying the resultant force on the bottom and top mounting rings 16, 22 for producing a leveling action on the sprung mass of the vehicle.

In the illustrated arrangement the leveler unit 10 is included in an air supply system 34 which is of a semi-closed or closed type to prevent an undesirable accumulation of moisture within the system.

The system 34 includes a compressor 36 having an outlet 38 connected by a supply conduit 40 to an unobstructed inlet fitting 42 that leads directly into the control chamber 32.

The compressor 36 is of the type that operates continuously during operation of the vehicle whereby an excessive amount of air is supplied to the chamber 32 when the vehicle is level.

The amount of pressure build up within the chamber 32 is under the control of an exhaust valve assembly 44 which is operative in response to changes in the height relationship between the bottom mounting rings 16 and the top mounting ring 22 to control air flow to and from the chamber 32.

In the illustrated arrangement the valve assembly 44 is connected by a return conduit 46 to the low pressure side of the air supply system which in this illustrated arrangement is represented by the inlet 48 to the compressor 36.

Referring now to the embodiment of FIGS. 1 through 3, the air valve assembly 44 includes an outwardly bulged segment 50 on the outer cylindrical member 18 which receives a support bracket 52 for a movable elongated spring valve element 54.

The spring valve element is engaged by an actuator arm 56 which has the inner end 58 thereof in spring biased engagement with the upper end 60 of the shock absorber cylinder 14 or against the side wall of the shock absorber cylinder 14 depending upon the height relationship between the mounting rings 16 and 22.

Thus, when the vehicle is level, a piston rod 62 of the shock abosrber 12 will be extended downwardly of the upper end of the shock absorber cylindrical member 14 as illustrated in FIG. 1 and the actuator arm 58 will be located against the end of the cap 60 whereby the valving element 52 will be in the unstressed position illustrated in FIGS. 1 and 2 in spaced relationship to open a single unitary resilient exhaust valve fitting 64 constructed in accordance with certain principles of the present invention or be bowed to engage fitting 64 to close it.

More particularly, the fitting 64 includes an inlet end 66 with a conical shape which is located within the control chamber 32. It includes a small diameter end 68 which flexes into seat engagement with the valving element 54 to define an adjustable seal for closing an axial passageway 70 from the inlet end 66 having a control orifice 71 therein.

A grooved portion 74 of the valve fitting 64 snap fits within an opening 76 of the outer cylindrical wall 18 for fixedly securing the fitting 64 in place thereon.

The unitary valve fitting 64 includes an elbow coupling defined by a tubular extension 78 which is bent through a generally right angle turn on the outside of the cylindrical member 18 to form a fluid path from the axial passageway 70 to a base portion 80 on the opposite end of the unitary fitting 64.

In the illustrated arrangement the base portion 80 includes a groove 82 there around in which is received a connecting strap 84 that loops the outside surface of the leveler unit for maintaining the right angle turn in the tubular extension 78.

The base portion 80 includes an outlet bore 86 therein with a large diameter groove 88.

The return conduit 46 includes an outwardly flared interlocking shoulder 90 thereon which is located in inter-locking relationship with the large diameter groove for connecting the end of the conduit 46 in good sealing relationship with the outlet end of the valve fitting 64.

In accordance with certain principles of the present invention the tubular extension 78 includes spaced apart side walls 92, 94 thereon having end walls 96, 98 respectively which serve as a stop for the end 100 of the exhaust conduit 46 when it is in its seated sealed relationship with the coupling portion 80.

In one working embodiment the unitary valve fitting is made of Buna N 60 durometer rubber.

The nominal length of the fitting overall from the inlet to the base is 1.25 inches.

The outside diameter of the extension 78 is 0.187 inches to give flexibility for a 90° elbow and the diameter of the inlet end 66 at the seat 68 thereof is 0.062 inches to give the flexibility of seating mentioned above.

The diameter of the base portion 80 at the groove 82 therein is 0.312 inches to give a strong support for connection of the fitting to the leveler unit.

The unit seals through a pressure range of from 0 – 150 psig within the operating chamber 32 and maintains the system against leakage where it passes exteriorly of the control chamber 32.

Furthermore, the arrangement permits a generally right angle flow of fluid from the cylindrical wall defining the control chamber 32. This enables a valving arrangement to be present within the unit having low stress characteristics during movements between the open and closed positions thereof in response to movement between the bottom and the top mounting rings 16, 22.

A further feature is that the inlet end of the valve fitting that has the flexible seat defined by the small diameter tip 68 can be readily replaced from exteriorly of the unit if a new valve seat is required or if a repair of the coupling between the exhaust tube 46 and the fitting 64 is necessary.

Another embodiment of the invention is illustrated in FIG. 5 which shows a valve fitting and coupling assembly 102 that is adapted to fit in the same location as the previously described valve fitting 64.

In this arrangement the valve fitting 102 includes a seal member 104 adapted to be connected to a cylindrical member such as the member 18 in the same way as is the inlet end 66 of the fitting 64.

More particularly, the inlet portion includes a resilient, conically shaped nose portion 106 like end 66 in the first embodiment. This is adapted to be located within the control chamber of a leveler unit like that previously discussed.

It includes a base 108 having a groove 110 therein that is adapted to inter-lockingly engage the cylindrical portion of the leveler.

The base 108 includes an exteriorly located wall portion 112 which has an outlet bore 114 therein which leads to a side slot 116 extending through one side of the base 108.

An axial passageway 118 through the conically shaped nose portion extends through an orifice 120 that controls exhaust flow from the control chamber.

From the orifice the fitting 102 includes an extension 122 thereon having an annular end flange 124 which is located generally concentrically of the outlet bore 114 to be communicated therewith through a passageway 126 through the extension 122.

The seal portion 104 is connected to an elbow coupling 128 which includes a flanged head 130 which extends into a press fit relationship with the member 104 at the outlet bore 114. The flanged head 130 includes a radially outwardly directed edge 132 thereon which is seated in an undercut opening 134 formed in seal member 104 continuously around the extension 122 therein.

The flange 124 is press fit in sealing engagement with the inside surface 136 of an opening in the head 130 to define a chamber 138.

The chamber 138 is communicated through a cross-over passageway 140 in coupling 128 with an outlet bore 142 therein.

The outlet bore 142 is adapted to receive an end portion 144 of a flexible exhaust conduit like the exhaust conduit 46 illustrated in the first embodiment. The conduit end 144 includes a flat surface 146 thereon which engages a stop surface 148 adjacent the cross-over passageway 140 leading to the outlet bore 142.

In this embodiment the conduit end 144 includes a flange 150 thereon which is sonically welded or heat sealed to the outer end 152 of a generally tubular shaped extension 154 on the coupling 128.

In this embodiment the component parts are preferably also made of a Buna N 60 durometer rubber.

The valve fitting 102 includes means for producing a right angle turn whereby flow can be made generally radially outwardly of the cylindrical portion of the leveler unit and then turned through 90° so that the exhaust conduit can be located close to one side of the leveler to obtain the above discussed advantages.

In both embodiments of the invention the valving element and the right angle coupling to the exhaust conduit locate the exhaust conduit closely adjacent the leveler unit such that there can be a wide range of movements between the top and bottom mounting rings of a leveler, for example, in the order of 4 – 5 inches without pulling the seal and coupling apart from the leveler unit during its operation.

While the embodiments of the present invention, as herein disclosed, constitute a preferred form, it is to be understood that other forms might be adopted.

I CLAIM:

1. An exhaust valve and coupling assembly for controlling fluid flow into and from a pressurizable control chamber defined by an outer cylinder of a leveler unit which has movable ends thereon adapted to be connected between the sprung and unsprung mass of a vehicle comprising: a resilient fitting adapted to be fixedly secured to the outer cylinder of the leveler unit including an inlet end located interiorly of the control chamber and an exhaust end located exteriorly thereof, said fitting including a flexible resilient seat located within the control chamber, an axial exhaust passageway through said fitting arranged generally perpendicularly to the longitudinal axis of the leveler unit, means for interconnecting said fitting with said cylinder at a point between the inlet end of said fitting and the exhaust end thereof for replacement of said fitting from outside said cylinder, a flexible exhaust tube arranged generally parallel to the longitudinal axis of the leveler unit on the exterior thereof, coupling means including an outlet bore therein for receiving one end of the tube, said coupling means including an elbow therein for connecting said tube receiving bore to the exhaust end of said fitting exteriorly of the cylindrical member of said leveler through approximately a right angle turn whereby the exhaust tube is locatable in close proximity to the leveler unit to prevent pull out of the fitting during operation of the leveler.

2. In a vehicle leveling system of the type including a leveler unit having a pressurizable chamber defined by means including a cylindrical member defining a control chamber having a longitudinal axis, an inlet into the chamber through the cylindrical member adapted to be connected to a pressure source and an outlet therefrom the improvement comprising: a movable exhaust valve element, a resilient valve fitting fixedly secured through the cylindrical member having an inlet end defining a seat for said movable exhaust valve element, said fitting having an exhaust end located exteriorly of the cylindrical member, means between said seat and said exhaust end of said fitting for interlockingly connecting said fitting to the member for replacement from outside the cylindrical member, said fitting having a flow passageway therethrough with a longitudinal axis arranged generally perpendicularly to the longitudinal axis of the cylindrical member, said valve element being movable along the axis of said flow passageway between open and closed positions with respect to said seat in response to changes in the length of the leveler unit, a tube locatable in spaced parallelism along the side of the cylindrical member adapted to be connected to the pressure source to define a return path for exhaust flow from the chamber to the pressure source, and coupling means for connecting the exhaust end of said fitting to said tube, said coupling means including a right angle turn flow path for communicating said fitting passageway with said tube through a right angle transition located exteriorly of said cylinder whereby the exhaust tube is locatable in close proximity to the leveler unit to prevent pullout of the fitting during operation of the leveler unit.

3. An exhaust valve and tube coupling assembly for controlling fluid flow to and from a pressurizable control chamber in a vehicle leveler unit of the type including an outer cylinder defining a control chamber and a pair of spaced apart ends adapted to be connected between the sprung and unsprung mass of a vehicle and movable to level the vehicle in accordance with the pressure in the control chamber comprising: a resilient fitting having an inlet end and an exhaust end, means for connecting said fitting in the cylinder to locate the inlet end thereof within the control chamber and the exhaust end thereof on the outside of said cylinder, said resilient fitting including a conical end thereon defining a flexible valve seat within the chamber, a movable valving element responsive to movement between the opposite ends of the leveler unit to move into and out of engagement with the seat to control exhaust flow through said fitting, a tubular extension on the exhaust end of said resilient fitting, a bore around said tubular extension having an undercut surface therein, said tubular extension having a flange thereon, an elbow coupling member of resilient material including an inlet thereon having a peripheral flange snap fit into said bore into seated engagement with the undercut surface therein, said elbow member having an inlet bore therein receiving the flange of said tubular extension in sealing relationship therewith, said elbow coupling member including an outlet bore intersecting said inlet bore thereof approximately at a right angle, said outlet bore receiving the end of a flexible tube extending along the outside surface of the cylinder in generally spaced parallelism to the longitudinal axis thereof.

4. An exhaust valve and tube coupling assembly for controlling fluid flow to and from a cylindrical member defining a pressurizable control chamber of a leveler unit of the type including spaced apart ends thereon adapted to be connected between the sprung and unsprung mass of the vehicle and movable apart from one another in accordance with the pressure in said chamber to level the vehicle comprising: a single unitary resilient member including a resilient valve seat directed through said cylinder, coacting means on said resilient member and the cylinder for fixedly securing the unitary member thereon, said unitary member including an inlet and a longitudinal passageway therethrough in communication with the pressurizable control chamber, an exhaust end on said member, a base on said unitary member adapted to be located against one side of the cylindrical member, means for connecting said base to said cylindrical member, an outlet bore in said base adapted to receive one end of a flexible tube extending along the outside of the cylindrical member in spaced parallelism to its longitudinal axis, and a coupling elbow formed by an integral resilient tube extension between the exhaust end of said fitting and said base having a right angle bend between the exhaust end and the base to communicate the fitting with the base for flow of fluid through a right angle turn from within the control chamber into the tube.

* * * * *